US008112514B2

(12) United States Patent
Blencowe

(10) Patent No.: US 8,112,514 B2
(45) Date of Patent: Feb. 7, 2012

(54) METHOD AND SYSTEM FOR DEFINING MEDIA OBJECTS FOR COMPUTER NETWORK MONITORING

(75) Inventor: Andrew Blencowe, Windham, NH (US)

(73) Assignee: ARB Intellectual Property Holdings (HK), Limited, Hong Kong (HK)

( * ) Notice: Subject to any disclaimer, the term of this patent is extended or adjusted under 35 U.S.C. 154(b) by 845 days.

(21) Appl. No.: 11/475,019

(22) Filed: Jun. 27, 2006

(65) Prior Publication Data

US 2006/0294231 A1 Dec. 28, 2006

Related U.S. Application Data

(60) Provisional application No. 60/693,772, filed on Jun. 27, 2005.

(51) Int. Cl.
*G06F 11/00* (2006.01)

(52) U.S. Cl. ........ 709/224; 715/764; 715/765; 715/734; 715/736; 715/744

(58) Field of Classification Search .......... 715/734–738, 715/764, 765, 744; 709/223–226
See application file for complete search history.

(56) References Cited

U.S. PATENT DOCUMENTS

| 7,315,985 | B1 * | 1/2008 | Gauvin et al. | 715/734 |
|---|---|---|---|---|
| 2005/0010660 | A1 * | 1/2005 | Vaught | 709/223 |
| 2005/0114800 | A1 * | 5/2005 | Rao | 715/867 |
| 2006/0095461 | A1 * | 5/2006 | Raymond | 707/102 |

* cited by examiner

*Primary Examiner* — Kenneth R Coulter
(74) *Attorney, Agent, or Firm* — McIntyre-Lilley Intellectual Property Management Services

(57) ABSTRACT

Method and system for defining media objects, such as images and graphics, to represent computer networked resources and assets, along with their associated events, while monitoring the same in a real-time environment is disclosed.

13 Claims, 15 Drawing Sheets

METHOD AND SYSTEM FOR DEFINING MEDIA OBJECTS FOR COMPUTER NETWORK MONITORING

CLAIM OF PRIORITY UNDER 35 U.S.C. §119

The present Application for Patent claims priority to Provisional Application No. 60/693,772 entitled "Method and System for Defining Media Objects for Computer Network Monitoring" filed Jun. 27, 2005, and assigned to the assignee hereof and hereby expressly incorporated by reference herein.

BACKGROUND

The described embodiments generally relate to monitoring computer networks. More particularly, the described embodiments relate to a method and system for arbitrarily defining media objects to represent computer networked resources and assets, along with their associated events, while monitoring the same.

Today, there is no useful means to arbitrarily assign a graphic or picture, for example that represents a networked asset, such as a network node, when monitoring a computer network. As of now, a representation is predetermined and pre-selected to represent the asset, such as a hyperbolic computer network monitoring map, in common usage. However, the user of a monitoring application has no means to define a representation, which is tailored and user-defined. Such a representation would be useful in that it would not be generic, but more representative of and specific to the user's computer network.

Accordingly, it would be advantageous to provide a method and system for arbitrarily creating, defining and selecting media objects to represent computer network resources and the events and alerts associated with those same network resources.

BRIEF SUMMARY

The described embodiments comprise a method and system for defining media objects, which represent computer networked resources.

It is an object of the present invention to provide users with the ability to arbitrarily create media objects, e.g., images, representative of the enterprise-wide environment from servers to all worldwide devices.

It is an object of the present invention to permit users to add their own arbitrarily defined and selected media objects very efficiently without much time and effort.

It is another object of the present invention to permit users to add any type of media object they desire, such as, but not limited to geographic maps, but company-specific and/or proprietary schematics, and company factory locations, for example. Thus any image storable on a computer medium that is desired can be utilized as a media object of the present invention.

It is an object of the present invention to provide a method of defining a media object for monitoring a computer network, comprising providing a media object, wherein the media object is selected arbitrarily based upon user's non-predetermined decision-making. The media object can be any image storable on a computer medium, wherein the media object is loaded into a database and an indicia element is selected to be and placed on said media object. The media object is associated with at least one computer network resource. The method further comprises enumerating the indicia element with location, server, monitoring group or device information. The method further includes providing a machine list, applying filtering conditions for the indicia element to be displayed, along with providing event information and indicia element characteristics based upon event checking. The method further comprises providing the indicia elements with characteristics, such as static, dynamic, color, flashing, shape change and timed appearance.

It is another object of the present invention to provide a method of monitoring the status of computer network resources, comprising providing a computer network monitoring application, along with a media object, wherein the media object is selected arbitrarily based upon user's non-predetermined decision-making. The media object can be any image storable on a computer medium. The media object is associated with at least one computer network resource and displaying the object. The method further comprises associating an indicia element with the media object and enumerating the indicia element, placing it onto the media object and then displaying the indicia element. The method further comprises enumerating the indicia element with location, server, monitoring group or device information. The computer network resources are to be monitored based upon their operational status, geographic location and physical location, including real-time and historical status. The present invention's method further comprises providing a machine list, applying filtering conditions for the indicia element to be displayed, along with providing event information and indicia element characteristics based upon event checking. Also, it is an object of the present invention to provide indicia elements with characteristics, such as static, dynamic, color, flashing, shape change and timed appearance. Further, it is an object of the present invention to provide linking of media objects to one another and based upon their associated computer network resources, which the media objects represent.

It is another object of the present invention to provide a system for monitoring the status of computer network resources comprising a computer processing unit (CPU), wherein said CPU contains a computer network monitoring application for monitoring computer network-resources. The system further comprises a network topology database that contains computer network resource location, server, monitoring group and device information, along with media objects. The system further comprises a database having event and alert information predetermined by the user to indicate the status of the at least one resource, along a user interface, which displays the one media object. It is an object of the present invention to provide for the media object to be selected arbitrarily based upon user's non-predetermined decision-making, wherein the media object is any image storable on a computer medium.

It is a further object of the present invention to provide a system for monitoring the status of computer network resources wherein the network topology database comprises enumerated indicia elements that are displayed on the media object in a plurality of user defined states including static, dynamic, color, flashing, shape change and timed appearance.

It is a further object of the present invention to provide a system for monitoring operational status, geographic location and physical location of the resources are displayed by the media objects based upon both real-time and historical status. The system further comprises a database that contains event and alert information predetermined by the user to indicate the status of the computer network resources. It is also an object of the present invention's system to provide linking of media objects to one another and based upon their associated computer network resources, which the media objects represent.

Additional aspects and advantages of the disclosed embodiments are set forth in part in the description, which follows, and in part are obvious from the description, or may be learned by practice of the disclosed embodiments. The aspects and advantages of the disclosed embodiments may also be realized and attained by the means of the instrumentalities and combinations particularly pointed as follows, including the figures.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The following section describes several embodiments of the present invention based on drawings, while exemplifying the creation, defining and selection of media objects, including use for monitoring computer network resources for the method and system of the present invention.

Figure 1A:
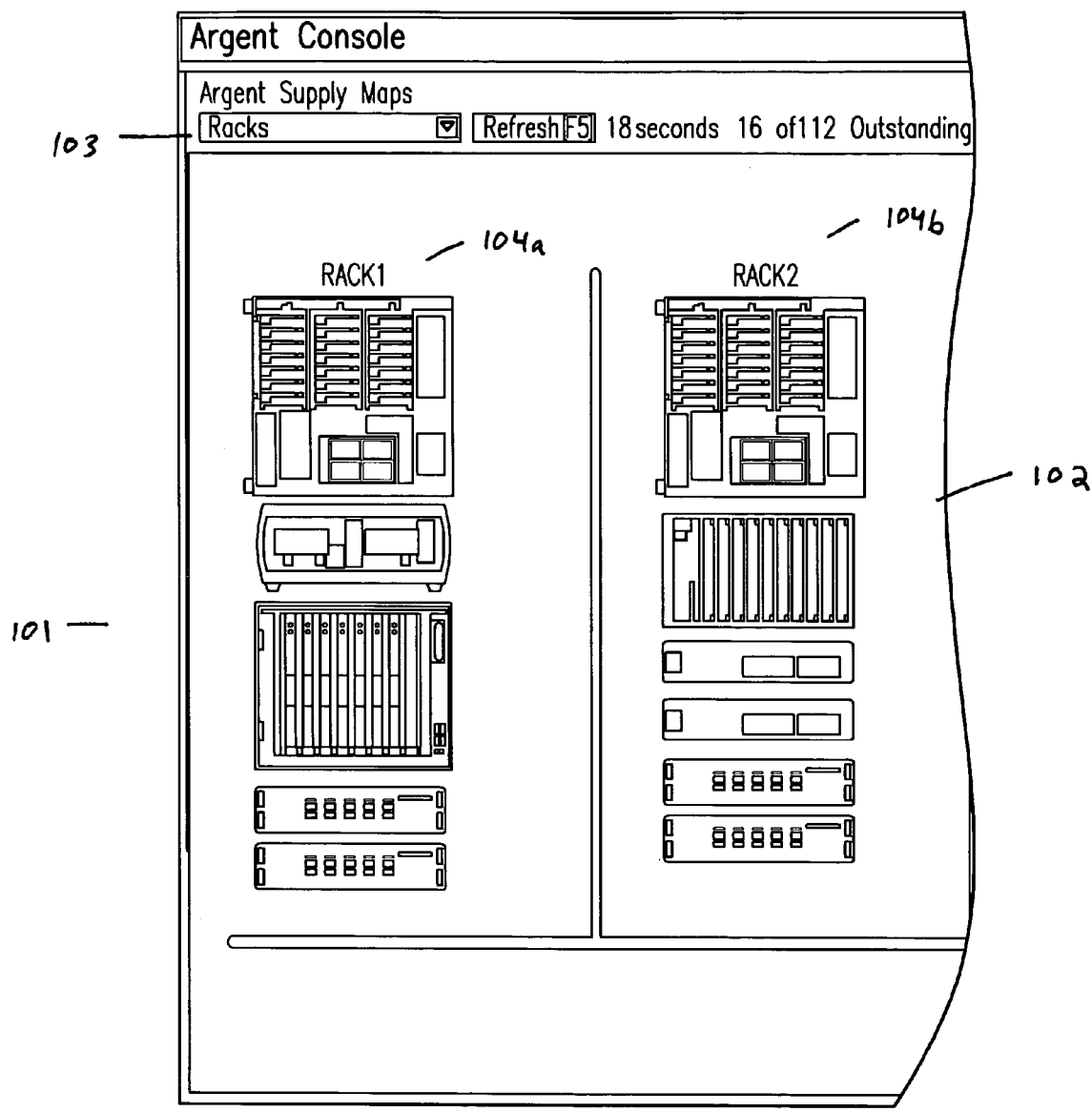
FIGS. 1A-B is a representative computer interface of one embodiment representing a media object of the present invention for a distribution of hardware within a rack server.
Figure 1B:
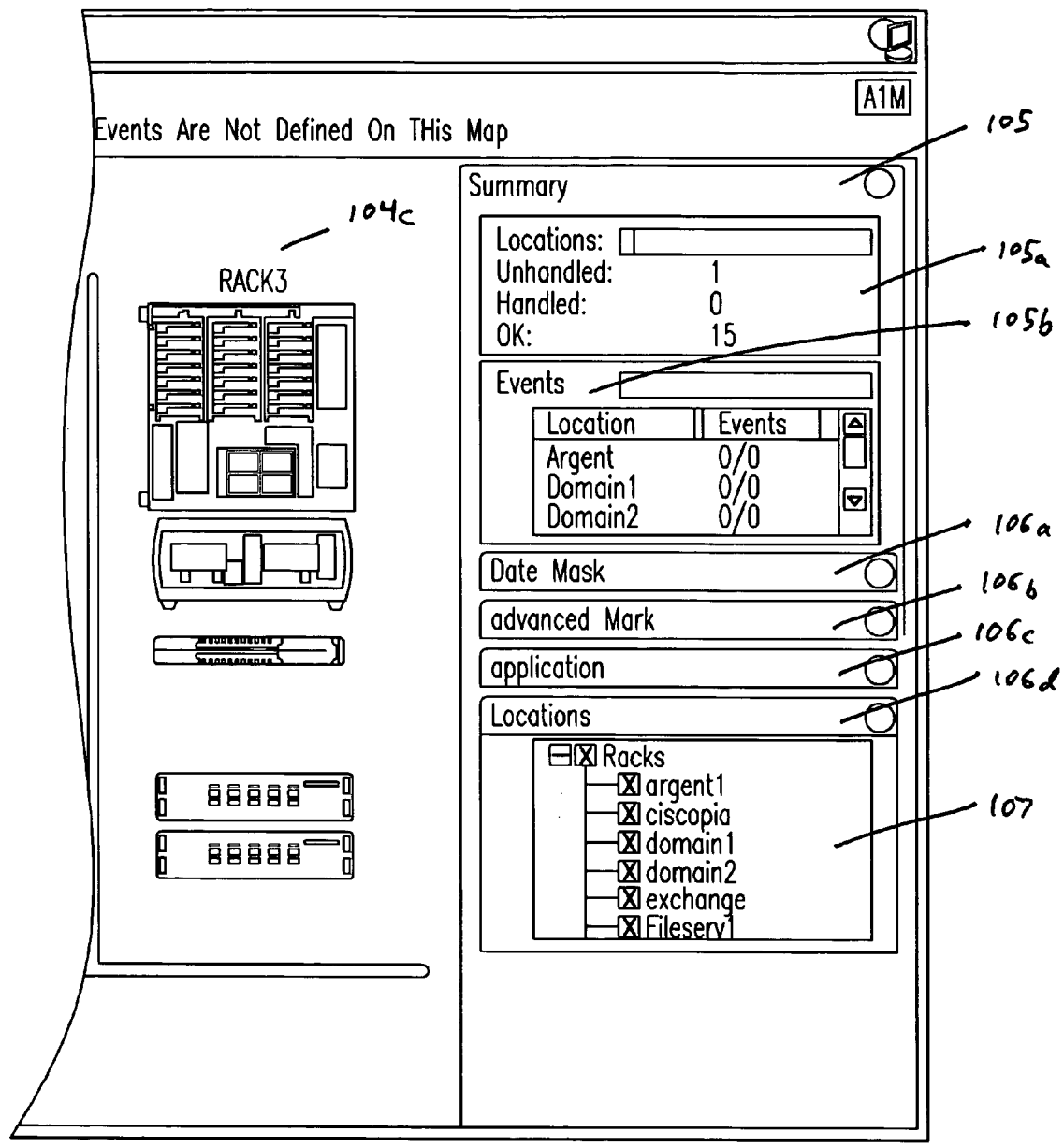

FIGS. 1A-B illustrate an embodiment of the present invention with a user interface 101 and a media object 102, wherein the interface 101 has menu panel 103 indicating what level of view is represented by the media object 102, e.g., computer racks. The media object depicts a distribution of hardware within racks 104a-c of devices that are being monitored. The user interface 101 has summary panel 105 indicating the status of the networked computer resources, including sub panels 105a-b. Additional panels 106a-d are also included, along with a locations subpanel 107 identifying the specific computer network resources being monitored.

Figure 2A:
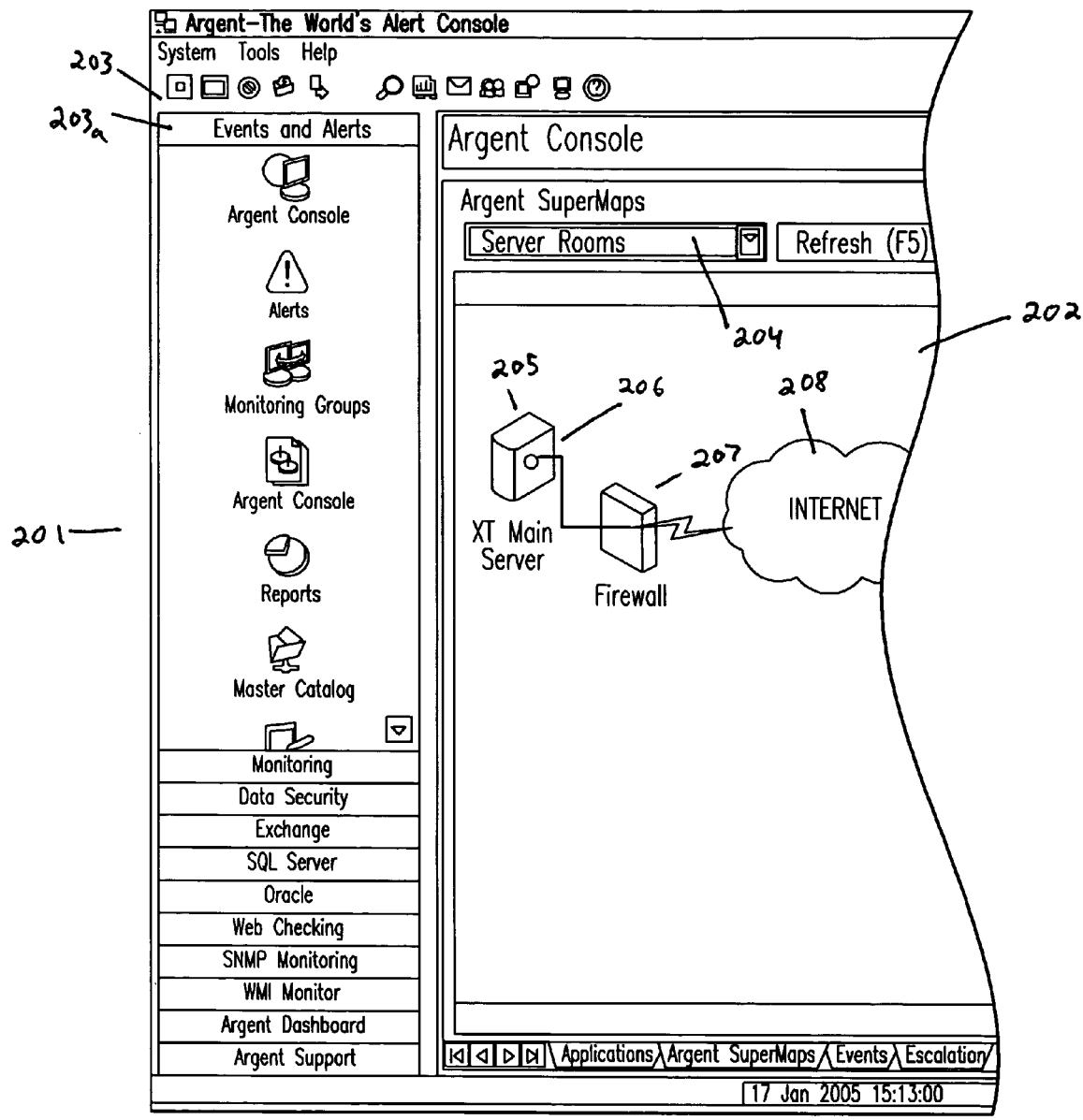
FIGS. 2A-B is a is representative computer interface of one embodiment representing a media object of the present invention for a server pool region and shows each individual server, as well as the alerts associated with server pool of FIGS. 3A-B.
Figure 2B:
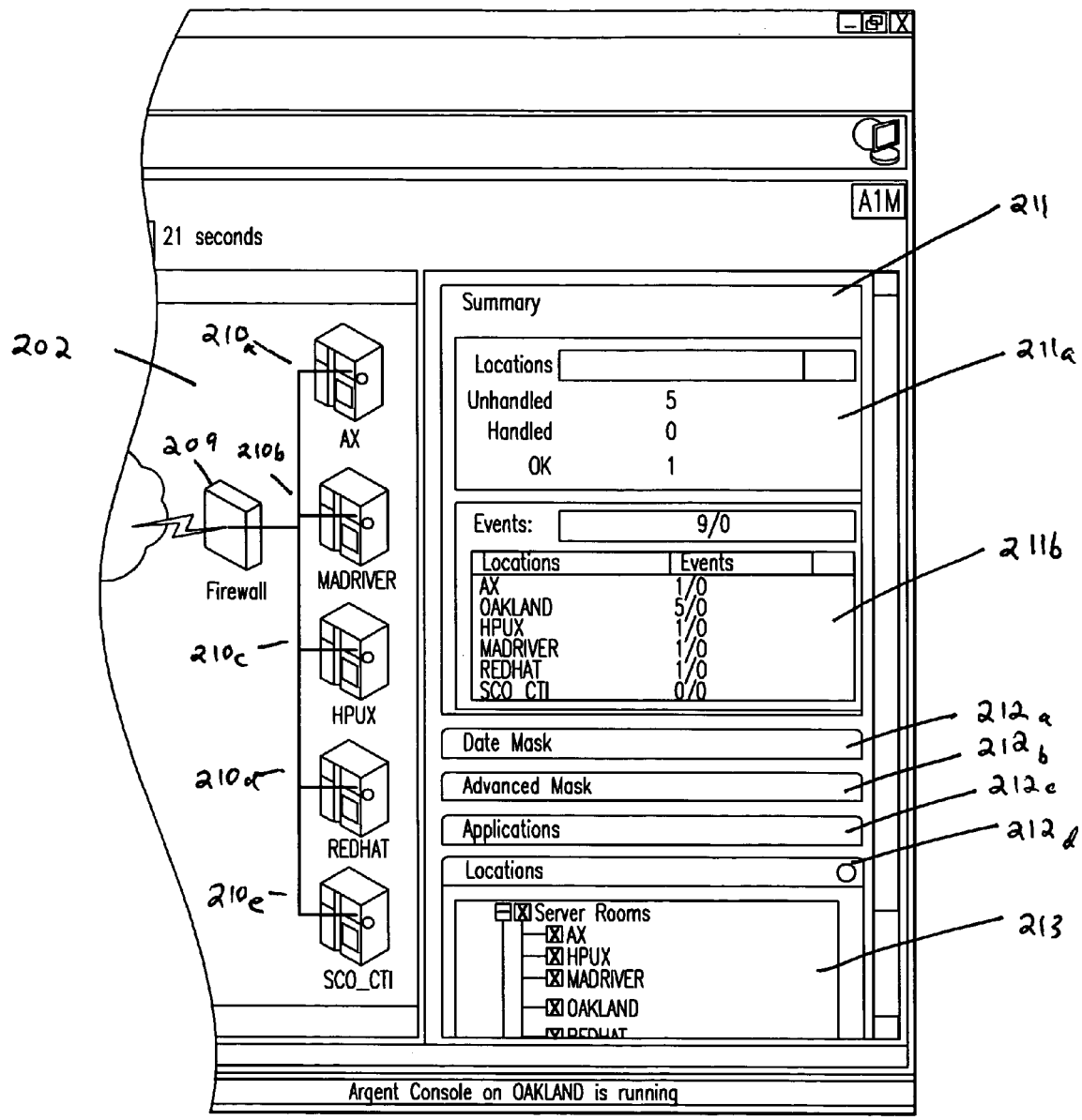

FIGS. 2A-B illustrate an embodiment of the present invention's media object in the form of server rooms of a computer network. The user interface 201 has a media object 202, along with monitoring application menu panels 203, e.g., events and alerts 203a in addition to a menu panel 204 indicating what level of view is represented by the media object 202, e.g., server rooms. Main server 205, along with an indicia element 206, indicating the operational status of the sever, firewalls 207, 209, a communications network, e.g., the Internet 208, and individual server rooms 210a-e are displayed. The user interface 201 has summary panel 211 indicating the status of the networked computer resources, including sub panels 211a-b. Additional panels 212a-d are also included, along with a locations subpanel 213 identifying the specific computer network resources being monitored.

Figure 3A:
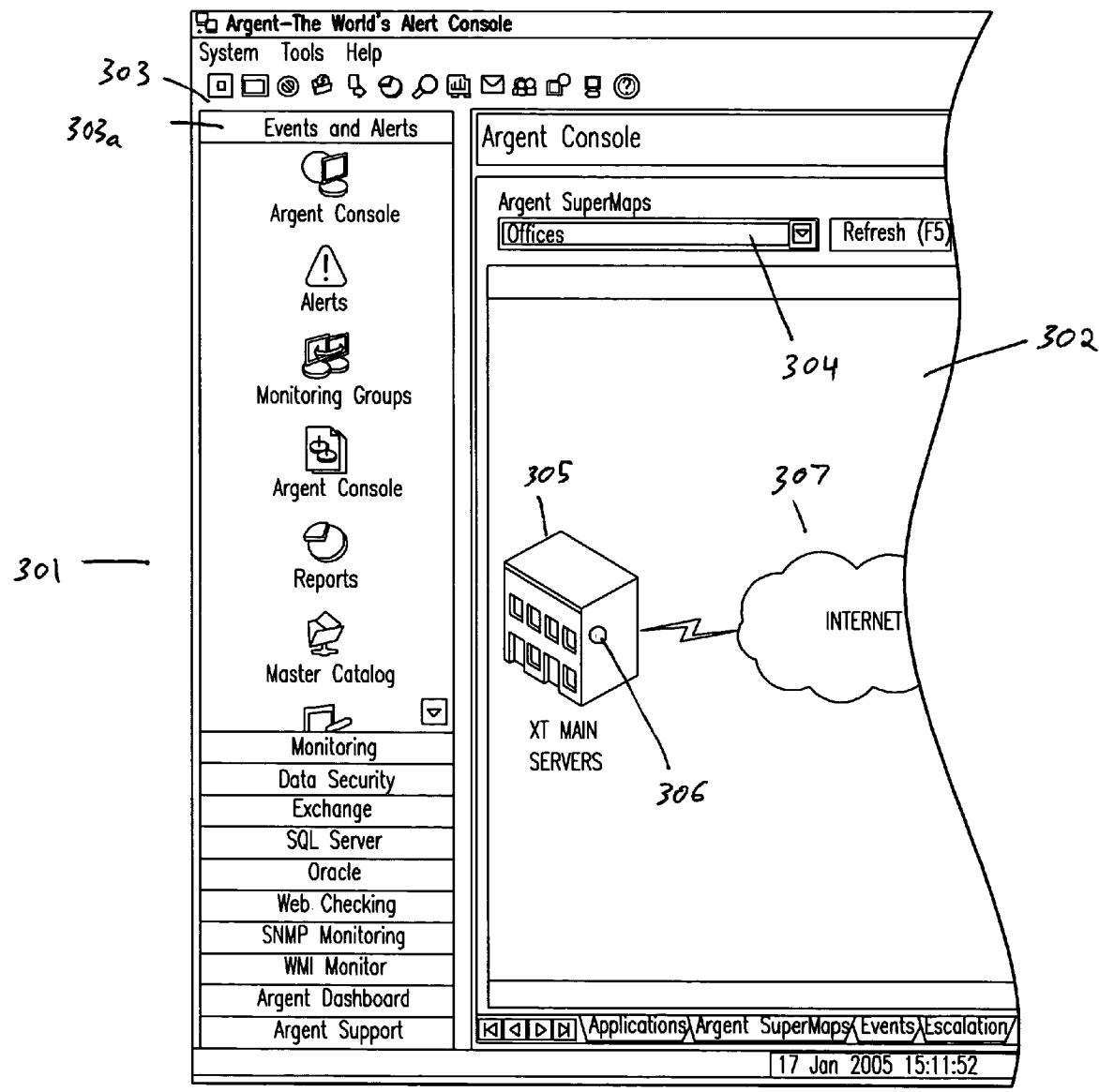
FIGS. 3A-B is representative computer interface of one embodiment representing a media object of the present invention for an office network media object for a city as represented in FIGS. 6A-B.
Figure 3B:
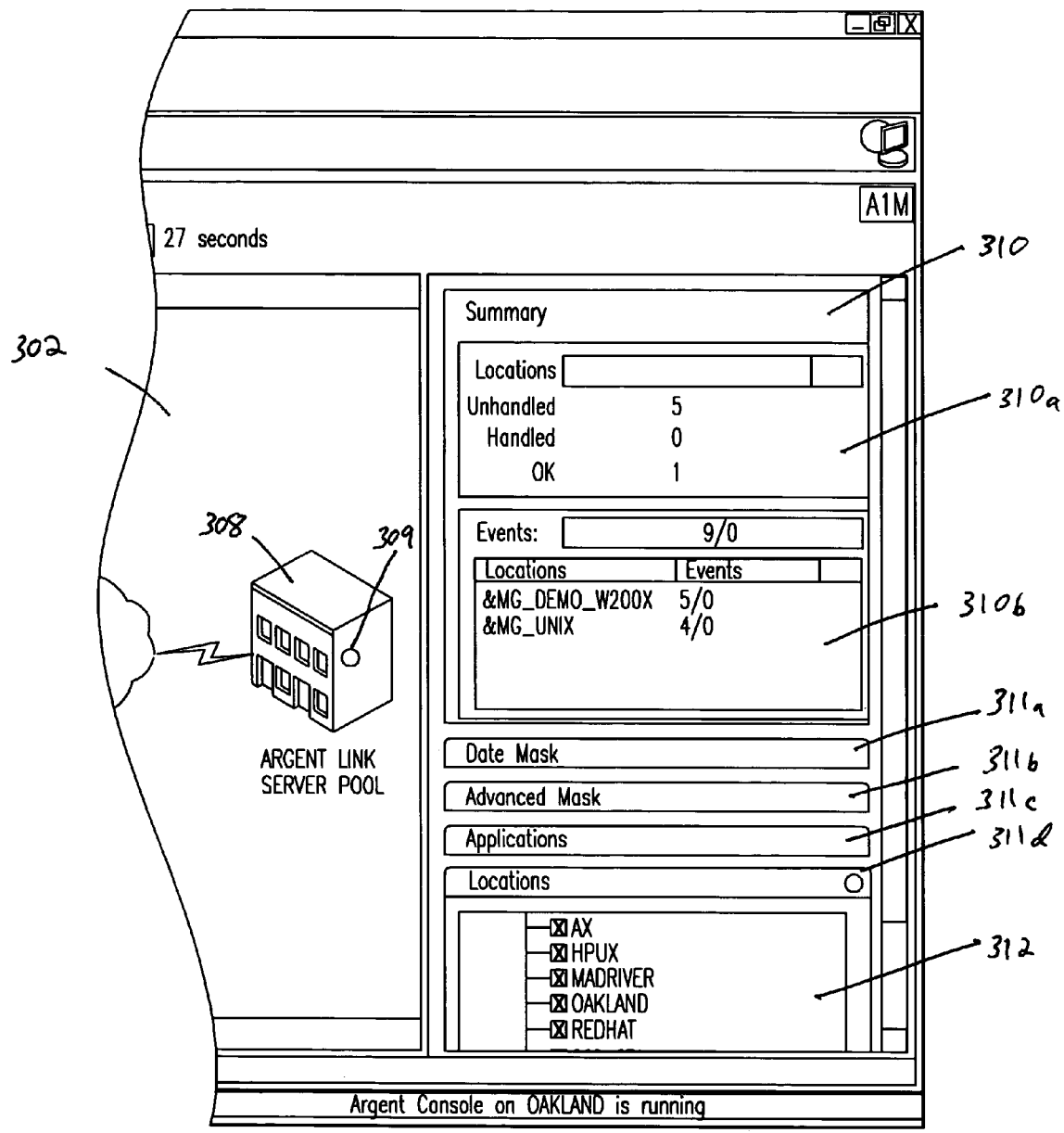

FIGS. 3A-B illustrate an embodiment of the present invention's media object in the form of offices containing the main servers and a server pool of a computer network. The user interface 301 has a media object 302, along with monitoring application menu panels 303, e.g., events and alerts 303a in addition to a menu panel 304 indicating what level of view is represented by the media object 202, e.g., offices. Main servers 305, along with an indicia element 306, indicating the operational status of the severs, a communications network, e.g., the Internet 307, and a server pool 308, along with its associated indicia element 309 are displayed in the media object 302. The user interface 301 has summary panel 310 indicating the status of the networked computer resources, including sub panels 310a-b. Additional panels 311a-d are also included, along with a locations subpanel 312 identifying the specific computer network resources being monitored.

Figure 4A:
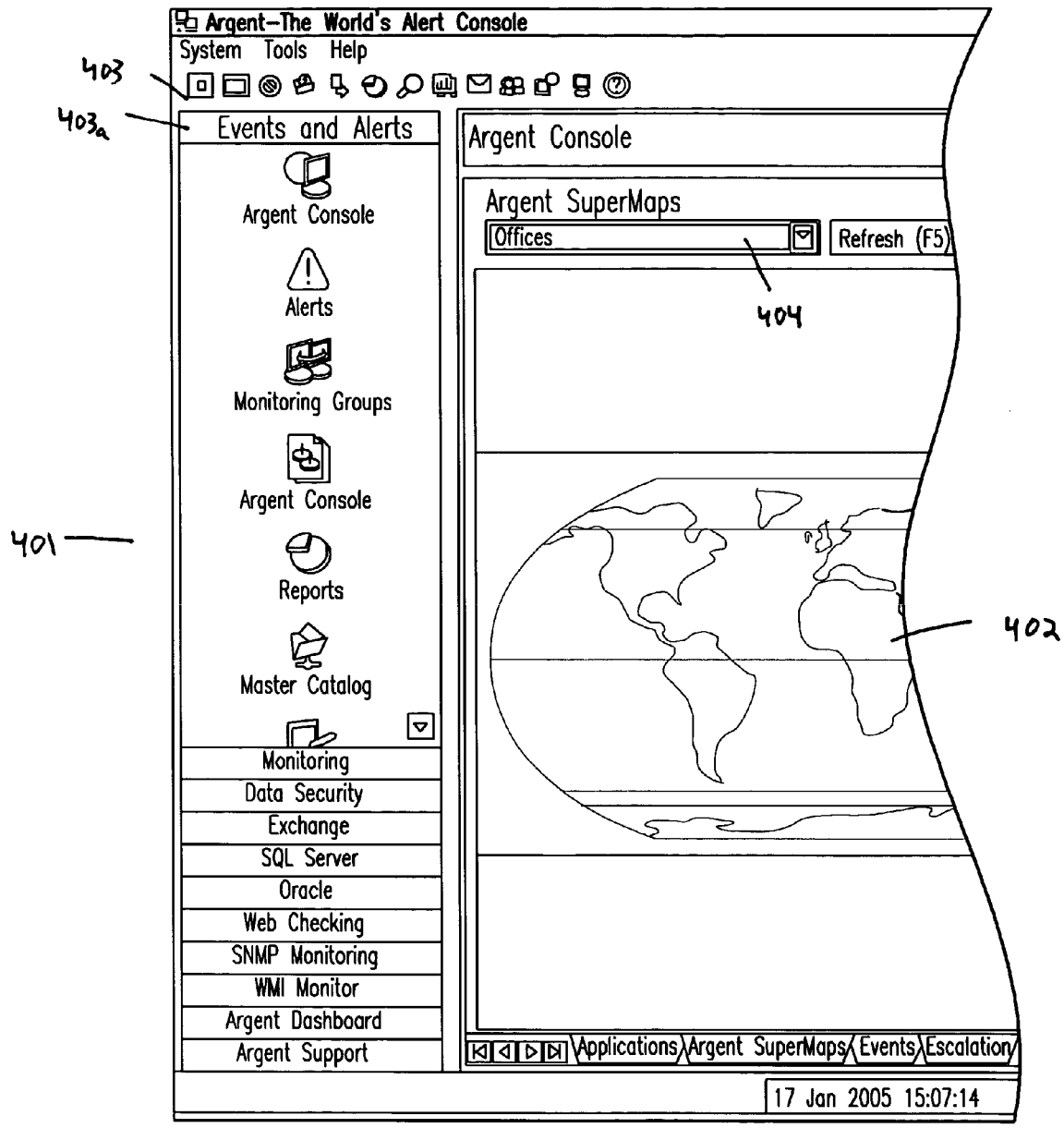
FIGS. 4A-B is a representative computer interface of one embodiment representing a media object of the present invention for a world-wide computer network.
Figure 4B:
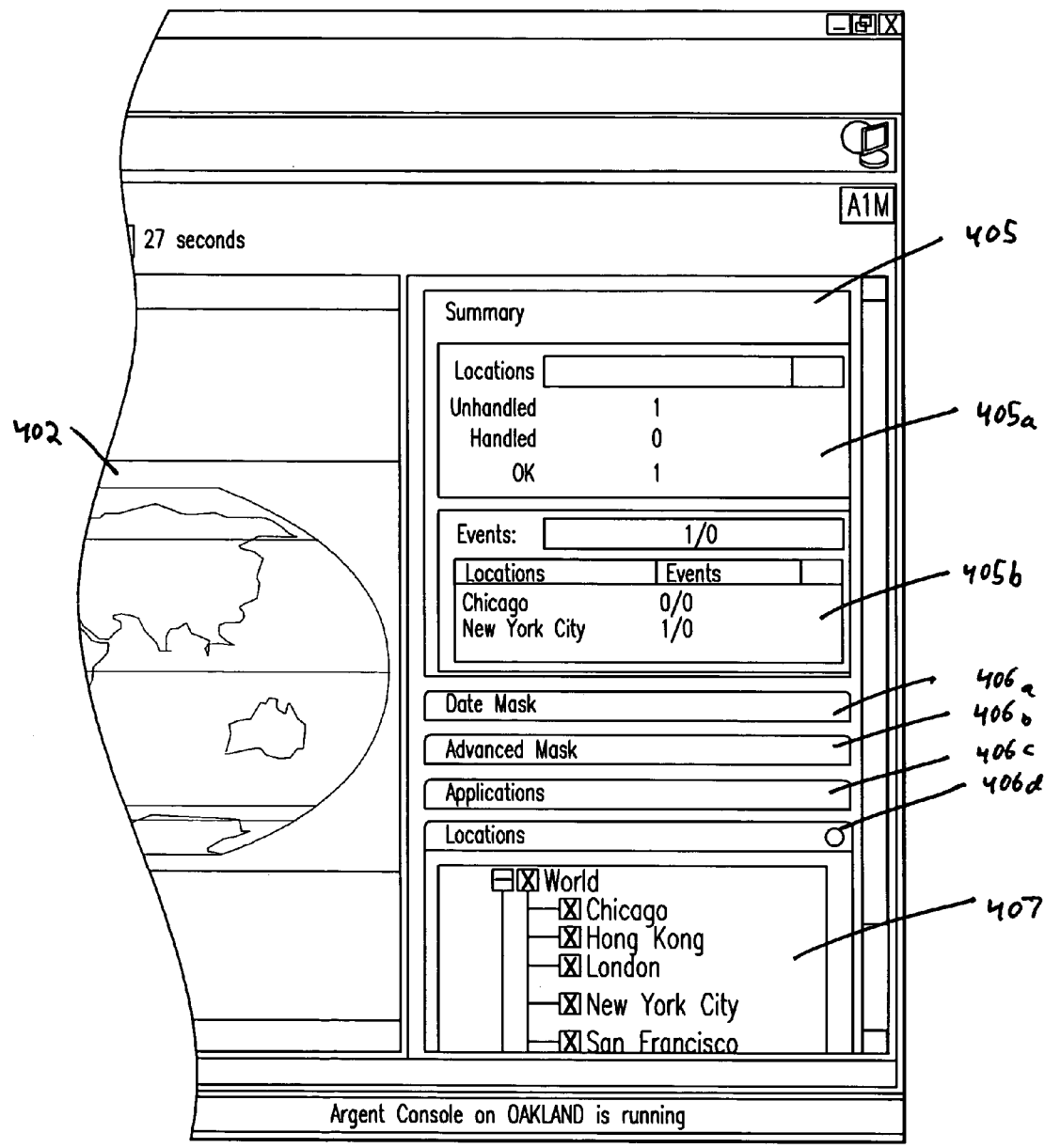

FIGS. 4A-B illustrate an embodiment of the present invention's media object in the form of a global depiction of the Earth containing the computer network resources. The user interface 401 has a media object 402, along with monitoring application menu panels 403, e.g., events and alerts 403a in addition to a menu panel 404 indicating what level of view is represented within the media object 402, e.g., offices of the world containing networked resources. The user interface 401 has summary panel 405 indicating the status of the networked computer resources, including sub panels 405a-b. Additional panels 406a-d are also included, along with a locations subpanel 407 identifying the specific locations of the computer network resources being monitored.

Figure 5A:
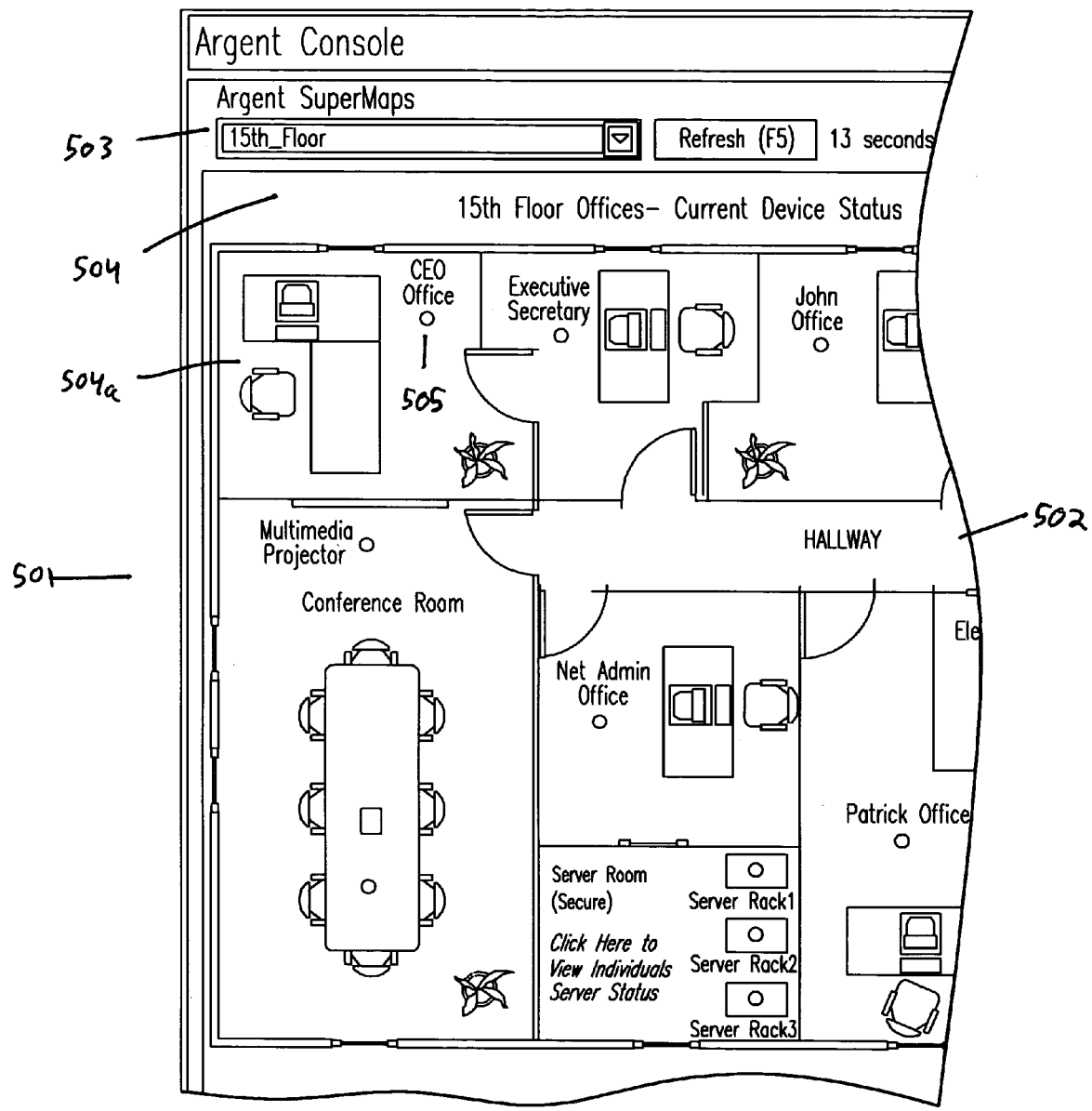
FIGS. 5A-B is a is representative computer interface of one embodiment representing a media object of the present invention laying out the various computer network systems and devices to be monitored in the form of a floor plan.
Figure 5B:
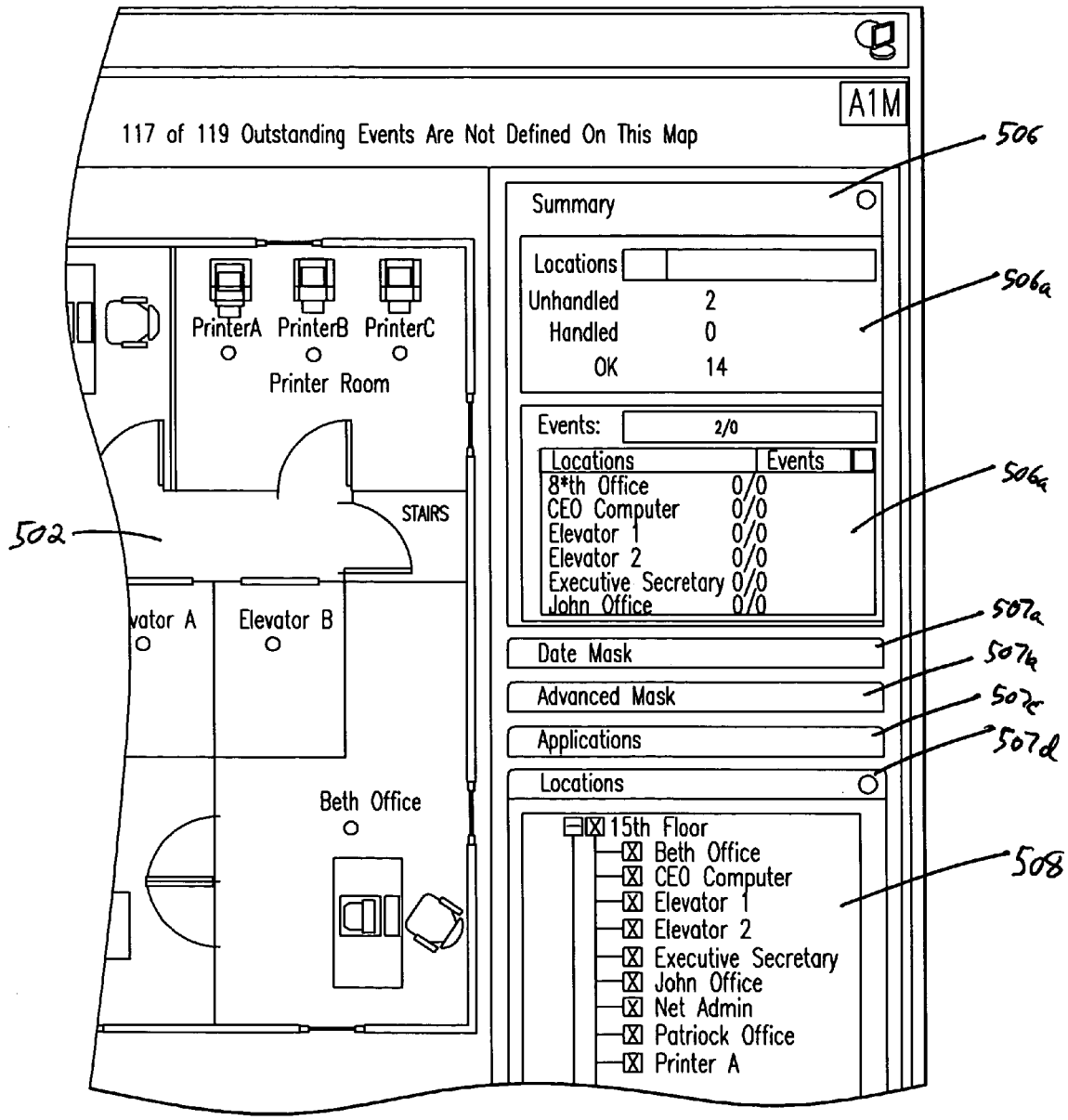

FIGS. 5A-B illustrate another embodiment of the present invention's media object in the form of a company floor plan laying out computer network systems and devices to be monitored. FIGS. 5A-B illustrate another embodiment of the present invention with a user interface 501 and a media object 502, wherein the interface 501 has menu panel 503 indicating what level of view is represented by the media object 502, e.g., 15$^{th}$ floor. The media object 502 depicts a company floor plan 504 laying out computer network systems and devices to be monitored. Specific offices, e.g., CEO office 504a, are depicted along with specific computer network devices in the form of indicia elements 505. The user interface 501 has summary panel 506 indicating the status of the networked computer resources, including sub panels 506a-b. Additional panels 107a-d are also included, along with a locations subpanel 508 identifying the specific computer network resources being monitored.

Figure 6A:
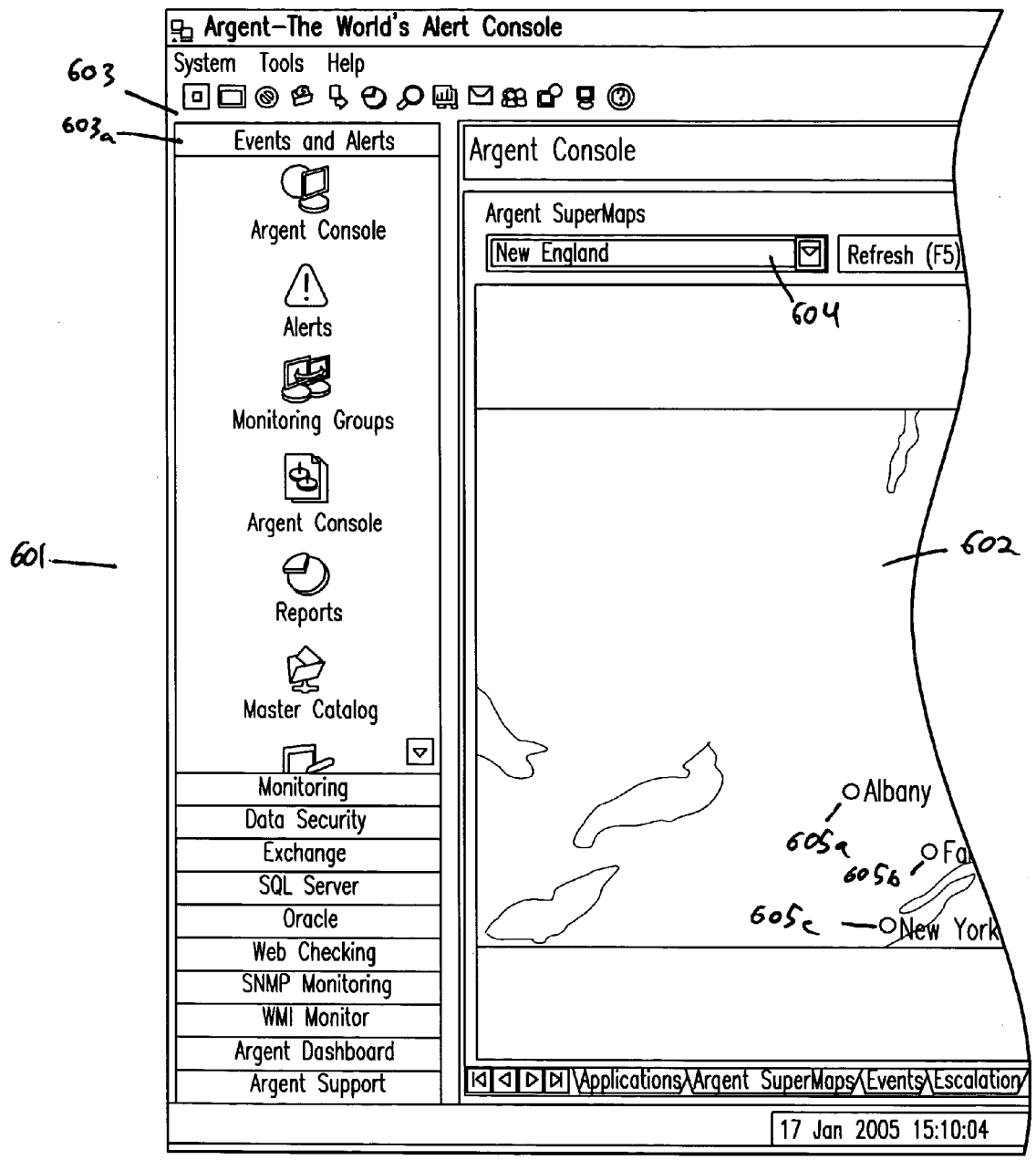
FIGS. 6A-B is representative computer interface of one embodiment representing a media object of the present invention for a region-wide computer network.
Figure 6B:
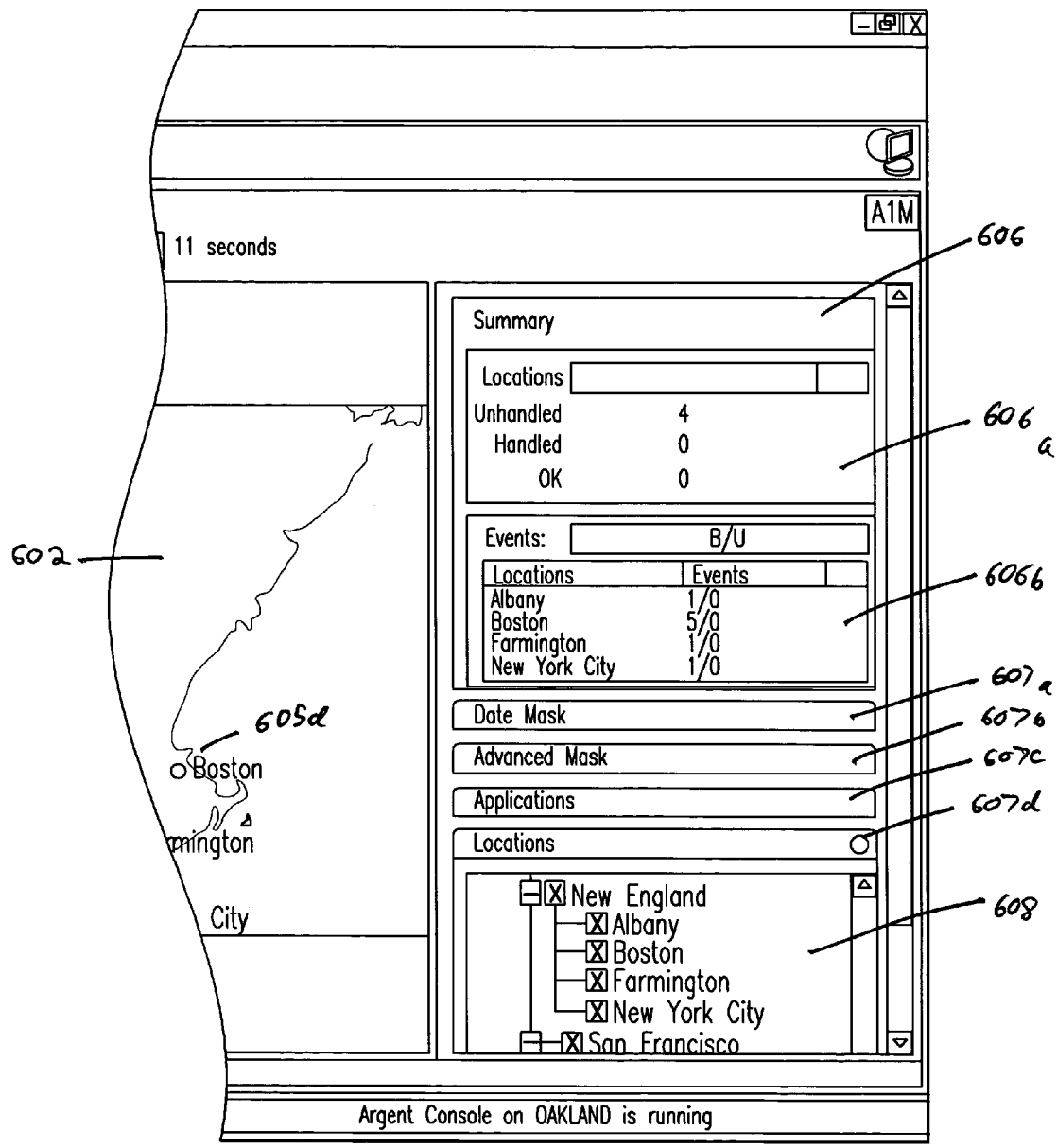

FIGS. 6A-B illustrate an embodiment of the present invention's media object in the form of a geographical region containing the computer network resources. The user interface 601 has a media object 602, along with monitoring application menu panels 603, e.g., events and alerts 603a in addition to a menu panel 604 indicating what level of view is represented within the media object 602, e.g., region of New England. Locations of specific cities are represented by their respective indicia elements, Albany 605a, Farmington 605b, New York 605c, and Boston 605d, within the media object 602. The user interface 601 has summary panel 606 indicating the status of the networked computer resources, including sub panels 606a-b. Additional panels 607a-d are also included, along with a locations subpanel 608 identifying the specific locations of the computer network resources being monitored.

Figure 7A:
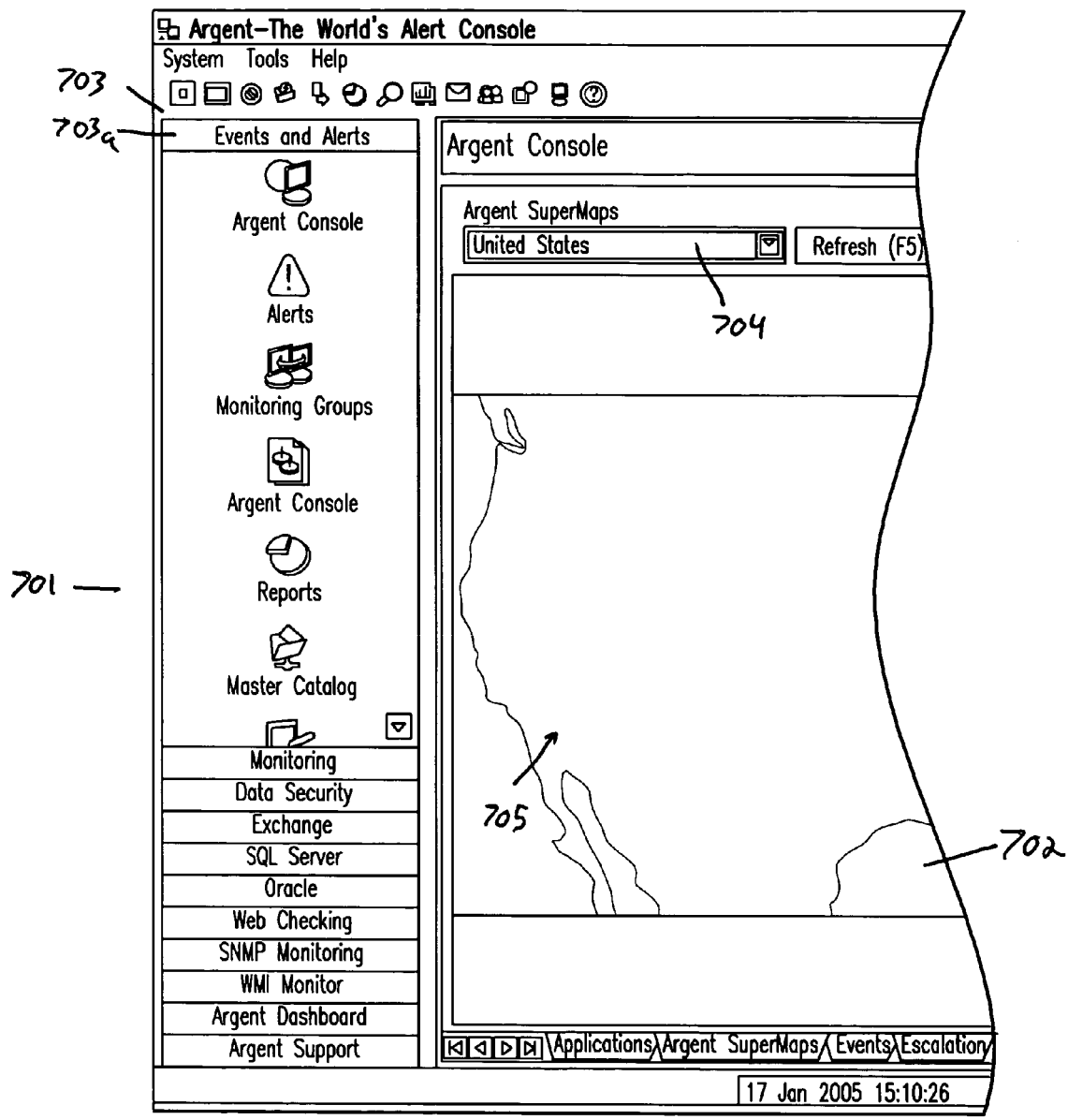
FIGS. 7A-B is a representative computer interface of one embodiment representing a media object of the present invention for a nation-wide computer network.
Figure 7B:
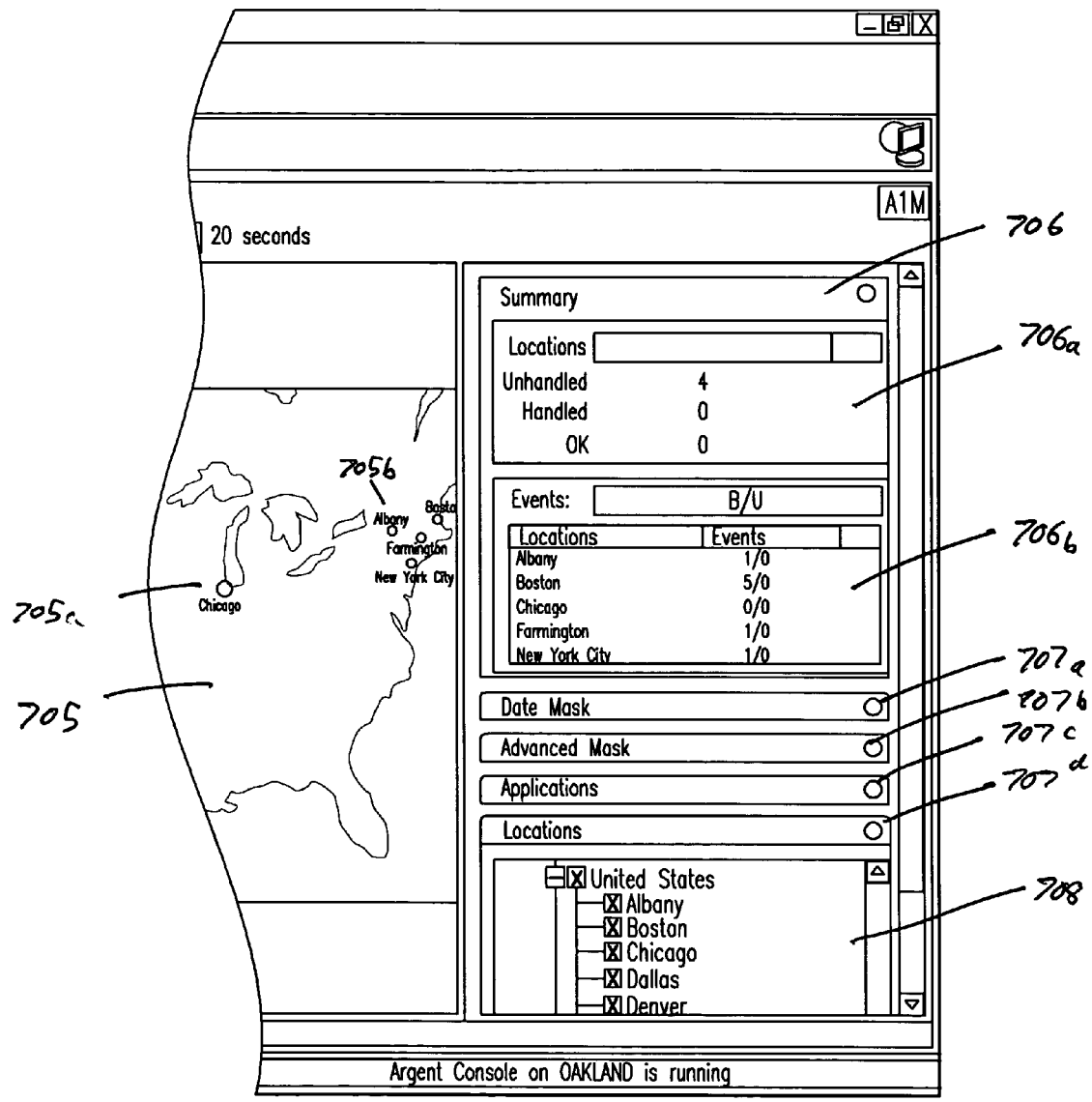

FIGS. 7A-B illustrate an embodiment of the present invention's media object in the form of a country containing the computer network resources. The user interface 701 has a media object 702, along with monitoring application menu panels 703, e.g., events and alerts 703a in addition to a menu panel 704 indicating what level of view is represented within the media object 702, e.g., country of the United States. Locations of specific cities are represented by their respective indicia elements, e.g., Chicago 705a, Albany 705b, etc., within the media object 702. The user interface 701 has summary panel 706 indicating the status of the networked computer resources, including sub panels 706a-b. Additional panels 707a-d are also included, along with a locations subpanel 708 identifying the specific locations of the computer network resources being monitored.

It should be noted that, as can be seen from FIGS. 1-7, additional specific status information concerning each network resource's location and performance is represented in a status window, e.g., Summary, as a sub-panels in these embodiments of the present invention.

According to the present invention, the status of the network asset, e.g., server, can be displayed in a plurality of user defined manners, e.g., color, as red, yellow or green dots, indicia elements, depending on the status of the server or device. The status is associated with a user predetermined definition, e.g., normal operation, system error, etc.

Please not that the user of the term "dot" refers to a representative indicia element for a network resource located on a media object according to the present invention.

Each dot, indicia element, is a single point, typically a location, a group of machines, or an individual server/device. It should be noted that multiple dots are also used for different types of servers/devices in the same location.

According to the present invention, the media objects are linked by functional hot-links, which is similar to image map in HTML pages. In one embodiment of the present invention, a left-click of a user's workstation mouse on which the invention is implemented takes the user's view of the media objects down a level, while a left double click takes up a level.

According to the present invention any media object, such as a map or an image in any conventionally known format, e.g., JPEG, BMP and DIB, can be used. Media objects are widely available on public domain map sites and under the present invention, users can add their own proprietary, organization/enterprise-specific images, as well as geographic maps, for example. Also, according to the present invention the media object selected arbitrarily based upon user's non-predetermined decision-making and media object is any image storable on a computer medium.

Under the present invention, users have complete control, i.e., arbitrarily, in a non-predetermined manner, in determining the visual presentation of the computer network and its resources, in the form of a media object according to the present invention. The media object of the present invention includes any image storable on a computer medium, which represents the computer network resources in some generalized or specified form. Accordingly, the user can specify the key characteristics, including text alignment and color, for example, of the media object, itself, or of the indicia elements representing the locations, servers, monitoring groups or devices of the computer networked resources.

The method of the present invention is designed to consume less than one percent of overall CPU usage at maximum load and more particularly less than half a percent. Thus, the method of the present invention permits the use of minimal operational demand on existing conventional networks with which it is utilized.

Figure 8:
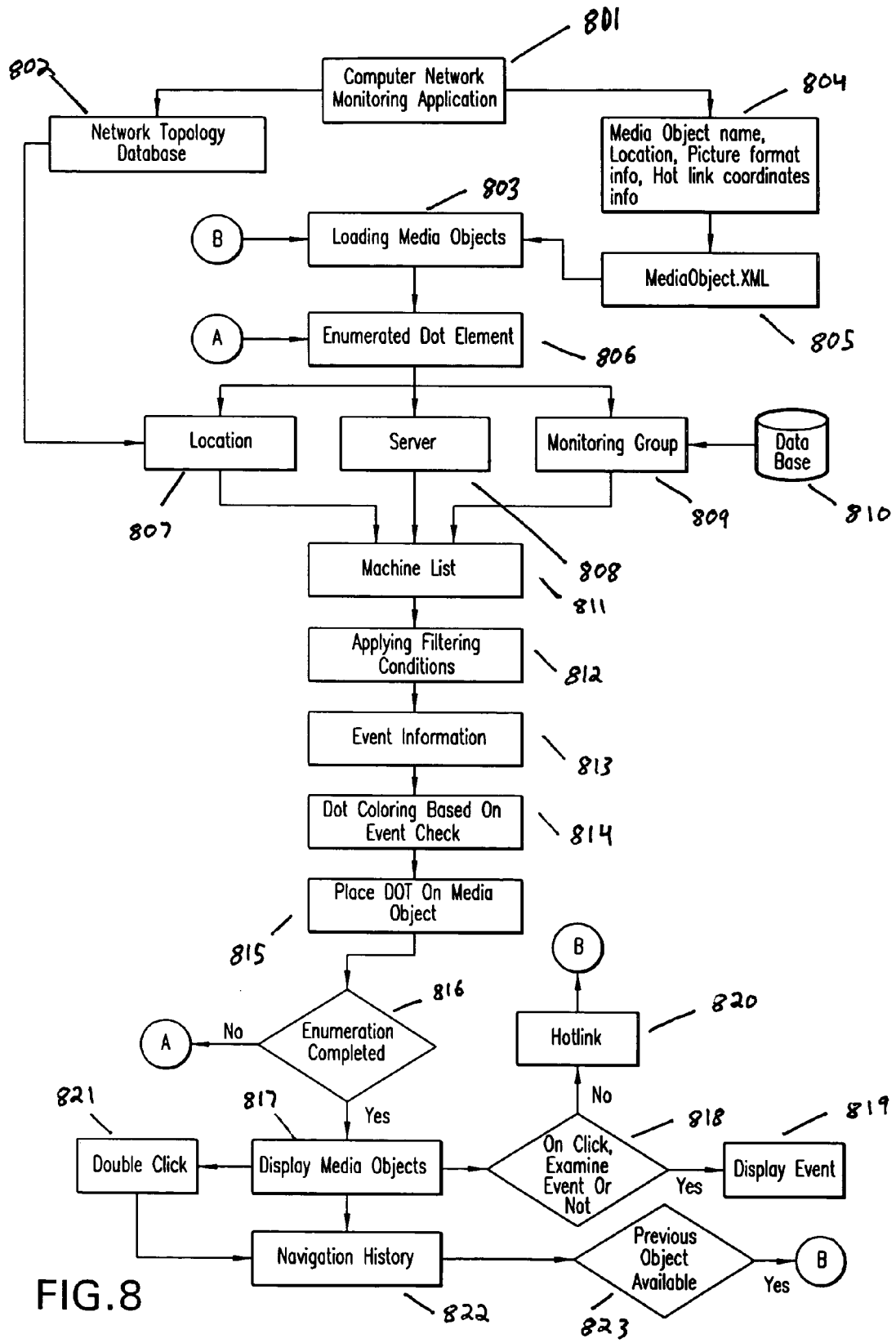
FIG. 8 is a flowchart of one embodiment of a method of defining media objects for computer network monitoring.

FIG. 8 is a flowchart of an embodiment of the present invention's method of defining and displaying media objects for computer network resource monitoring. A computer network monitoring application is provided 801 having a network topology database 802 contains details of the user's computer networked resources, such as the resource names, IP address, type, characteristics, etc. of each location 807, monitoring group 809, server 808, computer or device that is to be monitored. It should be noted that conventional computer network monitoring applications can be used according to the present invention.

Accordingly, this embodiment of the present invention the method comprises loading the media object 803 and its associated information 804 in XML format, or any other conventional format for Internet and web programming, e.g., Argent_media object.xml, including individual media object name, used JPEG or BMP file, location and hotlink coordinates, etc. Following is an example of such a XML 805:

EXAMPLE 1

```
<ARGENT_MEDIA OBJECT default="World">
    <VIEW name="United States" path="us.jpg">
        <CITY name="Albany" x="569" y="123" align="top" color="255, 255, 0"/>
        <CITY name="Boston" x="607" y="114" align="top" color="255, 255, 0"/>
        <CITY name="Chicago" x="424" y="175" align="bottom" color="255, 255, 0"/>
        <CITY name="Dallas" x="315" y="323" align="right" color="255, 255, 0"/>
        <CITY name="Denver" x="230" y="208" align="bottom" color="255, 255, 0"/>
        <CITY name="Farmington" x="593" y="131" align="left" color="255, 255, 0"/>
        <CITY name="Houston" x="347" y="366" align="right" color="255, 255, 0"/>
        <CITY name="Los Angeles" x="54" y="276" align="right" color="255, 255, 0"/>
        <CITY name="New York City" x="584" y="150" align="bottom" color="255, 255, 0"/>
        <CITY name="San Francisco" x="24" y="217" align="right" color="255, 255, 0"/>
        <LINK name="New England" x="546" y="104" width="70" height="53"/>
        <LINK name="New England" x="590" y="0" width="31" height="129"/>
```

-continued

```
    </VIEW>
    <VIEW name="Africa" path="africa.jpg">
        <CITY name="Cape Town" x="257" y="550"/>
    </VIEW>
    <VIEW name="Asia" path="asia.jpg">
        <CITY name="Beijing" x="356" y="310"/>
        <CITY name="Shanghai" x="398" y="358"/>
        <CITY name="Hong Kong" x="366" y="429"/>
        <CITY name="Tokyo" x="478" y="296"/>
        <CITY name="Manila" x="415" y="468"/>
        <CITY name="Taipei" x="409" y="400"/>
    </VIEW>
    <VIEW name="Europe" path="europe.jpg">
        <CITY name="London" x="157" y="371"/>
        <CITY name="Paris" x="176" y="416"/>
        <CITY name="Berlin" x="291" y="360"/>
        <CITY name="Madrid" x="87" y="543"/>
    </VIEW>
    <VIEW name="Australasia" path="oceania.jpg">
        <CITY name="Canberra" x="194" y="357" align="bottom" color="128, 0, 0"/>
        <CITY name="Sydney" x="204" y="348" align="right" color="128, 0, 0"/>
        <CITY name="Wellington" x="326" y="399"/>
    </VIEW>
    <VIEW name="Canada" path="ca-map.jpg">
        <CITY name="Montreal" x="457" y="273"/>
        <CITY name="Ottawa" x="443" y="278"/>
        <CITY name="Toronto" x="428" y="296"/>
        <CITY name="Vancouver" x="201" y="246"/>
    </VIEW>
    <VIEW name="South America" path="south_america.jpg">
        <CITY name="Lima" x="104" y="266"/>
        <CITY name="Santiago" x="175" y="455"/>
        <CITY name="Brasilia" x="359" y="295"/>
        <CITY name="Buenos Aires" x="238" y="502"/>
    </VIEW>
    <VIEW name="World" path="physical_world_2003.jpg">
        <CITY name="Chicago" x="162" y="105" align="bottom" color="128, 0, 0"/>
        <CITY name="Hong Kong" x="505" y="146"/>
        <CITY name="London" x="305" y="85"/>
        <CITY name="New York City" x="188" y="108" align="right" color="128, 0, 0"/>
        <CITY name="San Francisco" x="112" y="107" align="left" color="128, 0, 0"/>
        <CITY name="Shanghai" x="510" y="129" align="right" color="128, 0, 0"/>
        <CITY name="Sydney" x="565" y="241" align="right" color="128, 0, 0"/>
        <LINK name="United States" x="111" y="96" width="62" height="33"/>
        <LINK name="Canada" x="117" y="70" width="90" height="25"/>
        <LINK name="Africa" x="323" y="127" width="45" height="129"/>
        <LINK name="Europe" x="310" y="62" width="73" height="36"/>
        <LINK name="South America" x="186" y="176" width="37" height="79"/>
        <LINK name="Asia" x="434" y="114" width="71" height="24"/>
        <LINK name="Australasia" x="516" y="220" width="44" height="35"/>
    </VIEW>
    <VIEW name="New England" path="new_england.jpg">
        <CITY name="Albany" x="311" y="322" align="right" color="255, 255, 0"/>
        <CITY name="Boston" x="420" y="314" align="right" color="255, 255, 0"/>
        <CITY name="Farmington" x="376" y="374" align="right" color="255, 255, 0"/>
        <CITY name="New York City" x="343" y="435" align="right" color="255, 255, 0"/>
        <LINK name="Offices" x="310" y="414" width="59" height="33"/>
    </VIEW>
    <VIEW name="Server Rooms" path="Server_Rooms.jpg">
        <CITY name="AX" x="621" y="69" type="server"/>
        <CITY name="DELL610" x="68" y="142" type="server"/>
        <CITY name="HPUX" x="630" y="319" type="server"/>
        <CITY name="MADRIVER" x="632" y="195" type="server"/>
        <CITY name="REDHAT" x="630" y="449" type="server"/>
        <CITY name="SCO_CT1" x="627" y="571" type="server"/>
    </VIEW>
    <VIEW name="Offices" path="offices.jpg">
        <CITY name="&MG_DEMO_W200X" x="109" y="315" custom="XT Main Servers" type="monitoring group"/>
        <CITY name="&MG_UNIX" x="604" y="314" custom="Argent Unix Server Pools" type="monitoring group"/>
        <LINK name="Server Rooms" x="19" y="246" width="115" height="103"/>
        <LINK name="Server Rooms" x="518" y="249" width="119" height="101"/>
    </VIEW>
</ARGENT_MEDIA OBJECT>
```

According to the present invention, the XML file can be parsed using a conventional XML parser library application.

The present invention stores a location for each network group in a network topology database 802, e.g., network.xml as defined below. However, it should be noted that any conventional database structure can be utilized, e.g., SQL database, for example. In this embodiment, all the server/devices in the same group share the same location. Following is an example of an inventory resource tool monitor:

EXAMPLE 2

```
<NETWORK ver="A.BC-WXYZ">
  <ROUTING_GROUP name="Argent AIX Server Pool" location="New York City"
gateway="T1" firewall="yes">
    <NODE name="AX" domain="ARGENT" type="AIX Server"
ip="65.217.205.221"/>
  </ROUTING_GROUP>
  <ROUTING_GROUP name="Argent HPUX Server Pool" location="Boston"
gateway="T1" firewall="yes">
    <NODE name="HPUX" domain="ARGENT" type="HP-UX Server"
ip="65.217.205.222"/>
  </ROUTING_GROUP>
  <ROUTING_GROUP name="Argent SUNOS Server Pool" location="Farmington"
gateway="T1" firewall="yes">
    <NODE name="MADRIVER" domain="ARGENT" type="Solaris Server"
ip="65.220.118.34"/>
  </ROUTING_GROUP>
  <ROUTING_GROUP name="Argent SCO Server Pool" location="Chicago"
gateway="T1" firewall="yes">
    <NODE name="SCO_CT1" domain="ARGENT" type="SCO Server"
ip="69.37.81.83"/>
  </ROUTING_GROUP>
  <ROUTING_GROUP name="Argent Linux Server Pool" location="Albany"
gateway="T1" firewall="yes">
    <NODE name="REDHAT" domain="ARGENT" type="Linux Server"
ip="65.220.118.36"/>
  </ROUTING_GROUP>
</NETWORK>
```

The present invention permits the displaying of user created, defined and selected media objects as images, irrespective of initial or intermediate format, e.g., JPEQ, BMP, etc., as a background screen scene of a user interface for computer network resource monitoring. The image is displayed proportionally as a media object to fit the screen resolution of a user interface. The media object can be displayed in a custom static control, among other conventional design and display manners. A conventional image library can also be used to load media object in JPEG, BMP and/or other image formats. In an alternate embodiment, drawing an image, e.g., software drawing application, is used to create the media object. It should be noted that that if the static control size is smaller than the picture size, the picture is automatically proportionally sized to fit the control.

Continuing with reference to FIG. 8, the present invention's method of defining media objects comprises enumerating 806 an indicia element, "dot" as depicted on the media object. An indicia element is enumerated for example by identifying a dot, e.g., 'CITY', on the user selected media object. 'CITY' tag is used for backward compatibility purposes. If the element is a city, search the network topology database 802, e.g., network.xml or resource catalog, to get the network group in the location, identify out all the devices that are located in city, then add the devices to an internal list comprised of device and its status.

According to an embodiment of the present invention, event information is retrieved for the network resources in the locations 807, included in the monitoring groups 809, or server/devices 808 specified in the selected media object. For the purposes of this embodiment, the devices are any networked computer resource, e.g., server, router, or application, such as a firewall.

If the element is a monitoring group 806, the monitoring group definition is read from a database 802, all the devices in the monitoring group are identified, and then the devices are added to an internal list, comprised of monitoring groups and their status. If the element is an individual server/device, the device is selected and added to an internal list. According to the present invention, the internal list, e.g., machine list 811 is combined with filtering conditions 812, such as date/time range, event criticality mask, etc., to compose an SQL statement, then event information 813, which is read from a database 810, e.g., SQL database, which contains alerts generated for events that occur on the user's networked resources, such as computers and servers, that will be predetermined by the user to indicate the status of the resources when a media object is displayed, including the indicia elements displayed within the media object.

Accordingly, the present invention permits the display the "dots", i.e., indicia elements, which can be represented by any graphical reference indicating a point or location on a media object, such as a map, for example, representing locations, monitoring groups or individual servers and devices, in different altered states, e.g., color, flashing, shape change, timed appearance, etc., and all other variants encompassed by those of ordinary skill, depending on the related events associated with the network resource or asset, such as error in processing or operation, for example. The present invention permits the monitoring the status of computer network resources wherein said indicia element appears in at least one altered state, including static and dynamic. These altered states are static and/or dynamic in appearance. In an embodiment of the present invention, the indicia elements, e.g., dots, are be represented by colorized dot based upon an event check 814 of the computer resources, as defined in the database 810. Thus, for example, if there are no events for a location, the dot will be colored 'green'. However, if there are only events that have been addressed in some form, either automatically or by computer network personnel for the location, then the dot will be colored 'yellow'. If there are outstanding events that have not bee addressed for the location, then the dot will show as a flashing red, red or yellow based on the highest priority of the events, critical, medium or low respectively, for example.

The indicia element is then placed 815 or associated with the media object and its associated information 804. The actual dot, indicia element, location on the media object, e.g., picture, background, etc., is calculated based on the original co-ordinate and current proportional ratio. Depending on whether the enumeration is completed 816, the media object can be displayed 817 or the enumeration of the dot 806 can continue at step A. When the user selects a media object, e.g., uses a user interface pointing/input device to click on a media object, to examine it 818, an event is displayed.

Another aspect of the present invention is the use of media object linking, e.g., hot-links, which function similar to image map in HTML pages, in that they link media objects to form a hierarchy of media objects based upon linking. When a user clicks on the media object, the hot link information is checked 818. If the clicking co-ordinate is within a hot-link 820, an associated other 'linked', i.e., hierarchical, media object is displayed. If the co-ordinate is actually within a dot, the events of the dot are displayed 819 in a user-defined format, e.g., narratively. For example, this is done by using the user interface pointer device, e.g., computer mouse, to define the area of the media object to be linked to another media object to be placed in the hierarchy of media objects for displaying the media object. Additional media objects can be associated with each other by defining a hotlink and loading the additional media objects as in step B of FIG. 8.

Further, according to the present invention, when the user double-clicks 821 a media object, with the aid of a user interface pointer/input device, the navigation history 822 of the hierarchical media objects is remembered and stored for access by the user. For example, if the user double-clicks with the aid of user interface pointer/input device, such as a computer mouse, on the media object, the previous media object in the hierarchy will be displayed 823, as illustrated in FIG. 8. At this point, additional media objects can be loaded and associated, e.g., linked, according to the method of the present invention.

According to an embodiment of the present invention, when a user seeks to define the location of a media object, the present invention works in a design mode to define media objects and indicia elements. The user interface pointer device, e.g., computer mouse, events, WM_LBUTTON-DOWN, WM_LBUTTONUP, WM_MOUSEMOVE, for example, are used to specify location coordinates or the rectangle area of a hot-link within the media objects.

While the foregoing disclosure shows illustrative embodiments, it should be noted that various changes and modifications could be made herein without departing from the scope of the described embodiments. Furthermore, although elements of the described embodiments may be described in the singular, the plural is contemplated unless limitation to the singular is explicitly stated.

Those skilled in the art will recognize that the device and methods of the present invention has many applications, and that the present invention is not limited to the representative examples disclosed herein. Although illustrative, the embodiments disclosed herein have a wide range of modification, change and substitution that is intended and in some instances some features of the present invention may be employed without a corresponding use of the other features.

Moreover, the scope of the present invention covers conventionally known variations and modifications to the system components described herein, as would be known by those skilled in the art. Accordingly, it is appropriate that the appended claims be construed broadly and in a manner consistent with the scope of the invention.

What is claimed is:

1. A method of defining a media object for monitoring a computer network, comprising:
   providing a user created, defined and selected media object;
      wherein said media object is selected arbitrarily based upon user's non-predetermined decision-making;
      wherein said object is any image storable on a computer medium;
   providing a database;
   loading said media object into said database;
   selecting an indicia element to be placed on said media object;
   associating said media object with at least one computer network resource;
   enumerating said indicia element;
      wherein said enumerating comprises providing location, server, monitoring group or device information for said computer network resource;
      further wherein said enumeration comprises:
         providing a machine list;
         applying filtering conditions for the indicia element to be displayed;
         providing event information; and
         providing indicia element characteristics based upon event checking;
   placing media indicia on said media object;
   displaying said user created, defined and selected media object;
   displaying the operational status, geographic location and physical location of said computer network resource; and
   further displaying real-time and historical status.

2. A method of defining a media object according to claim 1 wherein said indicia element characteristics further comprises static, dynamic, color, flashing, shape change and timed appearance.

3. A method of monitoring the status of computer network resources, comprising:
   providing a computer network monitoring application;
   providing a user created, defined and selected media object;
      wherein said media object is selected arbitrarily based upon user's non-predetermined decision-making;
      wherein said object is any image storable on a computer medium;
   associating said media object with at least one computer network resource;
   providing at least one indicia element associated with said media object;
   enumerating said indicia element;
   providing a machine list;
   applying filtering conditions for the indicia element to be displayed;
   providing event information;
   providing indicia element characteristics based upon event checking;
   placing said indicia element on said media object;
   monitoring at least one said computer resource;
      wherein said monitoring includes the operational status, geographic location and physical location of said computer network resource;
      further wherein said status includes real-time and historical status; and displaying said user created, defined and selected media object.

4. The method according to claim 3 further comprises: displaying said indicia element.

5. A method of monitoring the status of computer network resources according to claim 4 wherein said enumerating further comprises providing location, server, monitoring group or device information for said computer network resource.

6. The method of monitoring the status of computer network resources according to claim 3, further comprises displaying said indicia element in a plurality of user defined states;
   wherein said states include static, dynamic, color, flashing, shape change and timed appearance.

7. A method of monitoring the status of computer network resources according to claim 3 further comprises linking said media object to another media object associated with said computer network resource.

8. A system for monitoring the status of computer network resources comprising:
   a computer processing unit (CPU);
      wherein said CPU contains a computer network monitoring application;
   at least one computer network resource to be monitored;
      wherein said monitoring is event information;
   a network topology database;
      wherein said topology database contains computer network resource location, server, monitoring group and device information;
      further wherein said database contains a machine list;
      wherein said topology database further contains a least one user created, defined and selected media object;
   a database;
      wherein said at least on media object is selected arbitrarily based upon a user's non-predetermined decision-making;
      wherein said network topology database further contains enumerated indicia elements;
      further wherein filtering conditions are applied to the indicia elements to be displayed;
      further wherein indicia element characteristics are provided based upon event checking;
   wherein said database contains event and alert information predetermined by the user to indicate the status of the at least one resource;
   a user interface; and
      wherein said interface displays the at least one said user created, defined and selected media object;
      wherein said interface displays the operational status, geographic location and physical location of said computer network resource
         further wherein said interface displays real-time and historical status.

9. A system for monitoring the status of computer network resources according to claim 8:
   wherein said object is any image storable on a computer medium.

10. A system for monitoring the status of computer network resources according to claim 8 further comprising a database, wherein said database contains event and alert information predetermined by the user to indicate the status of the at least one resource.

11. A system for monitoring the status of computer network resources according to claim 8 wherein said enumerated indicia elements are displayed on said at least one media object.

12. A system for monitoring the status of computer network resources according to claim 11 wherein said indicia elements are displayed in a plurality of user defined states;
   further wherein said states include static, dynamic, color, flashing, shape change and timed appearance.

13. A system for monitoring the status of computer network resources according to claim 8 wherein said media objects are linked to another media object associated with said computer network resource.

* * * * *